United States Patent Office 2,871,272
Patented Jan. 27, 1959

2,871,272

RACEMIZATION OF OPTICALLY ACTIVE MENTHOL

Robert R. Bottoms, Crestwood, Ky., assignor to Chemetron Corporation, a corporation of Delaware No Drawing. Application April 19, 1955
Serial No. 502,517

14 Claims. (Cl. 260—631)

This invention relates to the racemization of optically active menthol. More particularly, the invention relates to the racemization of dextro-menthol to convert it into the optically inactive form. More specifically, the invention relates to the racemization of d-menthol by heating it in the presence of hydrogenation catalysts and hydrogen.

In the synthesis of natural l-menthol there is formed an equal amount of d-menthol which is the unnatural isomer and which has no utility and little commercial value. l-Menthol, on the other hand, is widely used in flavoring and in medicine, and is therefore an important commercial chemical. Consequently, in the synthesis of l-menthol there has developed a need for converting d-menthol into a usable material or intermediate. A method which promotes the recovery or utilization of d-menthol will add to the economy of l-menthol syntheses and make such synthetic procedures more acceptable commercially.

The object of the present invention is to convert undesirable d-menthol to racemic menthol which can thereafter be resolved into equal amounts of l-menthol and d-menthol. It is another object of this invention to increase the efficiency of the synthesis of l-menthol by converting d-menthol to racemic menthol which can be further used in the synthesis. Other objects of the invention will be apparent from the following disclosure.

It is well known that the optically active menthols are highly stable compounds which resist methods of racemization known to be effective with other optically active compounds. While certain optically active substances such as piperitone may be racemized by heating to the boiling point, optically active menthols resist all such measures. Likewise certain organic optically active substances such as d-tartaric acid can be racemized by prolonged heating with concentrated alkaline solutions and others such as natural amino acids with concentrated acids. However, the optically active menthols are not racemized in this fashion.

The present invention comprises the discovery that an optically active menthol such as d-menthol on treatment at a temperature above 180° C. with a hydrogenation catalyst and hydrogen is racemized to a mixture of dl-menthol and racemic geometrical isomers of dl-menthol. The temperature under which the racemization occurs is in the range of 180° C. to 210° C., the preferred range being 200° C. to 210° C. The isomerization occurs in the presence of any of the common hydrogenation catalysts including Raney nickel, supported nickel catalysts such as nickel on kieselguhr, copper chromite, cobalt catalysts, rhodium catalysts, platinum black, palladium black, colloidal palladium, colloidal platinum, supported platinum and palladium catalysts, and similar hydrogenation catalysts. The presence of hydrogen is essential to the reaction, but its pressure need not be particularly great. Gauge pressures of 25 p. s. i. up to 1000 p. s. i. can be used. High pressures are not necessary since no hydrogen is absorbed by the reaction.

During the racemization reaction the special arrangement of the hydroxyl group in the 3-position is changed, as well as the spacial relationships of the groups attached to the asymmetric carbon atoms at positions 1 and 4. Consequently, the reaction mixture will contain not only racemic menthols, but other racemic geometrical isomers of menthol. The composition of the reaction mixture is essentially the same as that obtained on the reduction of thymol, menthone, pulegone, piperitone, and other menthenones. The crystalline dl-menthol can be separated from the reaction mixture by known procedures, and this material can be further resolved to l-menthol and d-menthol. The latter can be again treated as above and the mixture of isomers of menthol can be purified and resolved to provide further amounts of l-menthol. It is possible in this way to convert nearly all of the d-menthol to l-menthol by continued recycling.

A modification of the isomerization reaction, which is of considerable commercial interest, is the conduction of the isomerization reaction in the same vessel with the hydrogenation of thymol, menthone, pulegone, piperitone, menthenone, or other substances which are reducible to menthol. During the hydrogenation of these precursors to racemic menthol and racemic geometrical isomers of menthol, the isomerization reaction occurs and the d-menthol is converted to the same mixture of dl-menthol and racemic geometrical isomers of menthol. In general, it is preferred to use a weight proportion of d-menthol to menthol precursor of 1:1 to 1:4, although other proportions are satisfactory. In the commercial synthesis of l-menthol, the hydrogenation of menthol precursors is scheduled at regular intervals and it is convenient to add to the hydrogenation mixture any reasonable amount of d-menthol which is on hand. It is important that the hydrogenation be conducted at a temperature of at least 180° C., otherwise the optically active menthol will not be racemized and the reaction mixture will contain not only racemic menthol and geometrical isomers thereof, but also optically active menthol.

The following examples illustrate the invention without limiting it in any way. It will be readily apparent to those skilled in the art that different catalysts, different amounts of materials or varying conditions may be used without departing from the invention. Relative amounts of materials are given in parts by weight and temperatures are recorded in degrees centigrade.

*Example 1*

450 parts of d-menthol are melted and introduced into an autoclave. 6 parts of Raney nickel catalyst are added and the temperature is raised to 210° C. Hydrogen is introduced until a pressure of 100 lbs. per square inch is established. The mixture is agitated and maintained at 200° C. for two hours. At the end of that time the mixture of racemic menthol and racemic geometrical isomers of menthol is separated from the catalyst and subjected to fractional distillation under reduced pressure. A fraction is collected at 105° to 107° C. at 15 millimeters pressure and consists of racemic menthol. Upon cooling and seeding this product sets to solid crystalline mass. By centrifugation, non-crystalline material is separated and a yield of 200 to 255 parts of crystalline dl-menthol is thus obtained. No residual optical rotation can be detected, which indicates that the racemization of the optically active menthol is complete.

*Example 2*

A mixture of 300 parts of d-methol and 600 parts of thymol is melted and introduced into an autoclave. 12 parts of Raney nickel catalyst are added and the temperature is raised to 210° C. Hydrogen is introduced and agitation is maintained until the absorption of hydrogen ceases, indicating that all of the thymol has been reduced to menthol. The mixture of racemic menthol and racemic geometrical isomers of menthol is decanted from the catalysts and distilled. The cut distilling at 105–107° C. at 15 millimeters pressure is collected and this material consists almost entirely of pure dl-menthol. Seeding with crystals results in a solid crystalline mass of material which, after centrifugation to remove liquid isomers, consists of about 400 to 500 parts of dl-menthol.

What is new and desired to be secured by Letters Patent of the United States is:

1. A method of racemizing optically active menthol which comprises heating optically active menthol with a hydrogenation catalyst and hydrogen at a temperature of at least 180° C. but not greater than 210° C., and separating the racemic menthol from the reaction mixture.

2. A method of racemizing d-menthol which comprises heating d-menthol to a temperature in the range of 180 to 210° C. with a hydrogenation catalyst and hydrogen, and separating the dl-menthol from the reaction mixture.

3. A method of racemizing d-menthol which comprises heating d-menthol at a temperature in the range of 180 to 210° C. with a hydrogenation catalyst and hydrogen under a pressure of at least 25 lbs. per square inch, and separating the dl-menthol from the reaction mixture.

4. A method of racemizing d-menthol which comprises heating d-menthol at a temperature in the range of 180 to 210° C. with a nickel catalyst and hydrogen at a pressure of at least 25 lbs. per square inch, and separating the dl-menthol from the reaction mixture.

5. A method of racemizing d-menthol which comprises heating d-menthol at a temperature in the range of 180 to 210° C. with Raney nickel catalyst and hydrogen at a pressure of at least 25 lbs. per square inch, and separating the dl-menthol from the reaction mixture.

6. A method of producing racemic menthol which comprises heating a mixture of an optically active menthol and a substance reducible to menthol in the presence of a hydrogenation catalyst and hydrogen at a temperature of at least 180° C. but not greater than 210° C., said substance reducible to menthol containing a 6-membered carbon ring with a methyl radical in the 1-position, a member of the group consisting of isopropyl and isopropylidene radicals in the 4-position, a member of the group consisting of hydroxyl and keto radicals in the 3-position and at least one double bond in the molecule, and separating the racemic menthol thus formed.

7. A method of producing dl-menthol which comprises heating a mixture of d-menthol and a substance reducible to menthol at a temperature in the range of 180 to 210° C. in the presence of hydrogenation catalyst and hydrogen, said substance reducible to menthol containing a 6-membered carbon ring with a methyl radical in the 1-position, a member of the group consisting of isopropyl and isopropylidene radicals in the 4-position, a member of the group consisting of hydroxyl and keto radicals in the 3-position and at least one double bond in the molecule, and separating the dl-menthol thus formed.

8. A method of producing dl-menthol which comprises heating a mixture of d-menthol and a substance reducible to menthol in the presence of a nickel catalyst and hydrogen at a temperature in the range of 180 to 210° C. and at a pressure of at least 25 lbs. per square inch, said substance reducible to menthol containing a 6-membered carbon ring with a methyl radical in the 1-position, a member of the group consisting of isopropyl and isopropylidene radicals in the 4-position, a member of the group consisting of hydroxyl and keto radicals in the 3-position and at least one double bond in the molecule, and separating the dl-menthol thus formed.

9. A method of producing dl-menthol which comprises heating a mixture of d-menthol and a substance reducible to menthol in the presence of Raney nickel catalyst and hydrogen at a temperature in the range of 180 to 210° C. and at a pressure of at least 25 lbs. per square inch, said substance reducible to menthol containing a 6-membered carbon ring with a methyl radical in the 1-position, a member of the group consisting of isopropyl and isopropylidene radicals in the 4-position, a member of the group consisting of hydroxyl and keto radicals in the 3-position and at least one double bond in the molecule, and separating the dl-menthol thus formed.

10. The method of claim 9 wherein the substance reducible to menthol is thymol.

11. The method of claim 9 wherein the substance reducible to menthol is menthone.

12. The method of claim 9 wherein the substance reducible to menthol is piperitone.

13. The method of claim 9 wherein the substance reducible to menthol is menthenone.

14. The method of claim 9 wherein the substance reducible to menthol is pulegone.

References Cited in the file of this patent

UNITED STATES PATENTS

| | | |
|---|---|---|
| 1,776,087 | Schollkopf et al. | Sept. 16, 1930 |
| 1,776,667 | Schollkopf et al. | Sept. 23, 1930 |
| 1,776,669 | Schollkopf et al. | Sept. 23, 1930 |
| 1,811,711 | Blagden | June 23, 1931 |
| 1,811,777 | Blagden | June 23, 1931 |

OTHER REFERENCES

Simonsen: "The Terpenes," vol. 1, pp. 239–43; Cambridge at The University Press, 1953.

UNITED STATES PATENT OFFICE
CERTIFICATE OF CORRECTION

Patent No. 2,871,272                                               January 27, 1959

Robert R. Bottoms

It is hereby certified that error appears in the printed specification of the above numbered patent requiring correction and that the said Letters Patent should read as corrected below.

Column 2, line 1, for "special" read -- spacial --; column 4, line 23, for "pickel" read -- nickel --.

Signed and sealed this 19th day of May 1959.

(SEAL)
Attest:

KARL H. AXLINE
Attesting Officer

ROBERT C. WATSON
Commissioner of Patents